NO PRINTED SPECIFICATION AVAILABLE
7174X
I. S. Wright,
Washing Machine,
Patented July 18, 1832.
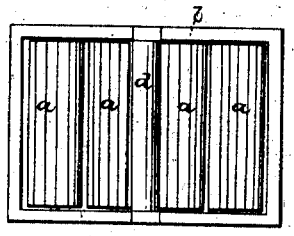
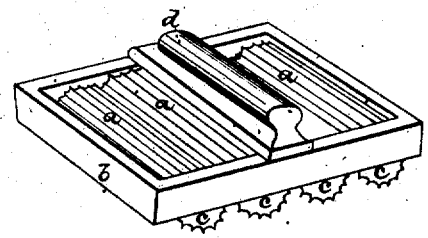
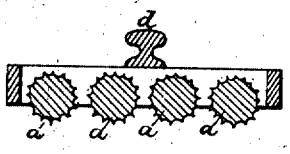
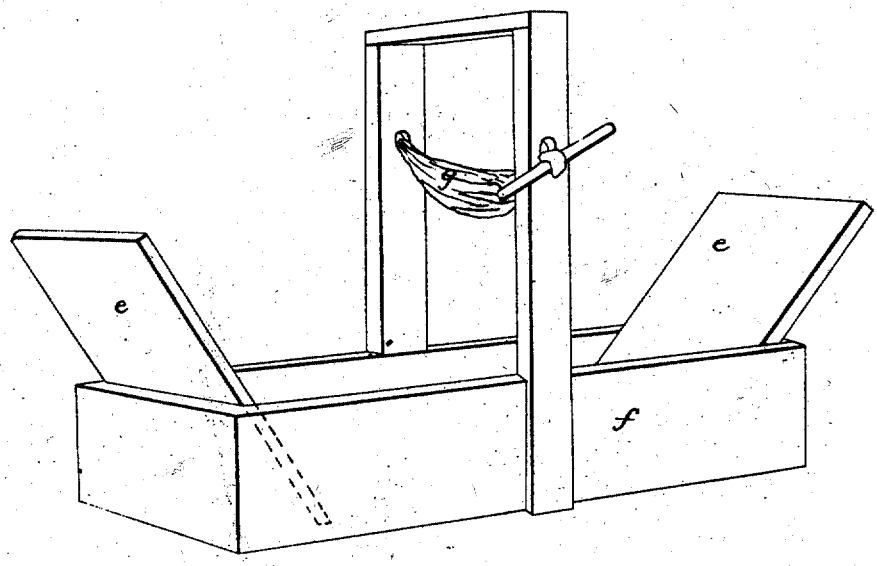

July 18 1832 115

7174X Isaac S. Wright
Letters Patent

The schedule referred to in these Letters Patent and making
part of the same containing a description in the words of the said
Isaac S Wright himself of his improvement in the Wash
ing Machine. To all whom it may concern Be it known
that I Isaac S Wright of Weedsport Cayuga County. New
York have invented an improved washing machine & that
the following is a full & exact description thereof. I prepare two
three or more rollers usually from four to five inches long and
from one & a half to two inches in diameter and reeded or fluted
from end to end. These rollers I fix within a suitable frame
or box sufficiently long to admit the rollers to be arranged with their
axes parallel to each other and to revolve without coming in-
to contact. Through this frame or box I pass wires, upon which
the rollers revolve freely, or otherwise I fix wires in each end of
the rollers so as to form gudgeons which run in metal or other
bearings in the frame or box. I however prefer the former method
of allowing the rollers to revolve upon the wires as being the most
durable. The wires or gudgeons are placed near to the edge of the
box or frame that the rollers may project from it at least one
third of their diameter. Across the back of this box or frame,
I affix a piece of wood, a strap or other contrivance to serve as a
handle, when the rollers are used. When this apparatus is
employed for washing a smooth board is taken which is made
in the form of the well known fluted washing board and is placed
in the tub in the same way but the clothes laid upon it are subjec-
ted to the action of the rollers which are passed up and down over
them, instead of being rubbed by hand and in this way they
are washed more rapidly, more effectually & with less injury to
the fabric than in any other. Instead of using a washing tub
I sometimes cause a trough to made of suitable length & width, it
may may be for eyample 18 inches wide three feet long and one foot high more or less. Sloping boards may be permanently fixed at each end enabling two persons to wash in it at the same time To this trough I also sometimes attach a wringing apparatus which is made by raising two standards above the trough one from the middle of each side, with a cross piece at top to brace them firmly. A coarse bag a strong net or ropes may be so fixed to these standards, that by turning one end by means of a winch or handle, clothes placed within will be effectu-ally wrung. I do not claim this apparatus as my invention but having been so long in use as to have become public proper-ty it is only mentioned with a view to point out the fa-cility with which it may be used in conjunction with my washing rollers. What I claim as my invention is the above described instrument consisting of two or more rollers fixed so as to revolve in a suitable boy or frame, which can be held in one hand and the rollers passed over the articles to be washed which articles rest upon a smooth board. The rollers instead of being enclosed in a box may be hung in a light iron or other frame merely sufficient to sustain the rollers and handle in their proper position. but I claim all such modes of fix-ing them by which they are so arranged as to operate upon the principle above described Isaac H. Wright Witnesses
Thos P. Jones
Wm Webb 6,414

634 a 80